(12) United States Patent
Richter et al.

(10) Patent No.: US 8,946,372 B2
(45) Date of Patent: Feb. 3, 2015

(54) USE OF TIN CATALYSTS FOR THE PRODUCTION OF POLYURETHANE COATINGS

(75) Inventors: Frank Richter, Leverkusen (DE); Raul Pires, Köln (DE); Stephan Reiter, Langenfeld (DE); Jens Krause, Leverkusen (DE); Klaus Jurkschat, Dortmund (DE); Ljuba Iovkova, Dortmund (DE); Markus Schürmann, Recklinghausen (DE); Gerrit Bradtmöller, Dorsten (DE)

(73) Assignee: Bayer Intellectual Property GmbH, Monheim (DE)

( * ) Notice: Subject to any disclaimer, the term of this patent is extended or adjusted under 35 U.S.C. 154(b) by 201 days.

(21) Appl. No.: 13/503,873

(22) PCT Filed: Oct. 26, 2010

(86) PCT No.: PCT/EP2010/066104
§ 371 (c)(1),
(2), (4) Date: May 17, 2012

(87) PCT Pub. No.: WO2011/051247
PCT Pub. Date: May 5, 2011

(65) Prior Publication Data
US 2012/0220717 A1    Aug. 30, 2012

(30) Foreign Application Priority Data

Oct. 30, 2009   (DE) .......................... 10 2009 051 445

(51) Int. Cl.
| C08G 18/08 | (2006.01) |
| C08G 18/24 | (2006.01) |
| B01J 31/02 | (2006.01) |
| C08G 18/28 | (2006.01) |
| C08G 18/79 | (2006.01) |

(52) U.S. Cl.
CPC ............. *C08G 18/24* (2013.01); *B01J 31/0201* (2013.01); *C08G 18/2825* (2013.01); *C08G 18/792* (2013.01)
USPC .............................................. 528/53; 528/58

(58) Field of Classification Search
CPC ..... C08G 18/16; C08G 18/242; C08G 18/246
USPC ................................................... 528/53, 58
See application file for complete search history.

(56) References Cited

U.S. PATENT DOCUMENTS 3,047,540 A   7/1962 Merten et al.
3,164,557 A   1/1965 Merten et al.

(Continued)

FOREIGN PATENT DOCUMENTS

DE    1111377 B    7/1961
DE    242617 A1    2/1987

(Continued)

OTHER PUBLICATIONS

International Search Report for PCT/EP2010/066104 mailed Jan. 28, 2011.

(Continued)

*Primary Examiner* — Michael L Leonard
(74) *Attorney, Agent, or Firm* — Drinker Biddle & Reath LLP

(57) ABSTRACT

The present invention relates to the use of specific inorganic Sn(IV) for the production of polyisocyanate polyaddition products from a) at least one aliphatic, cycloaliphatic, araliphatic and/or aromatic polyisocyanate, b) at least one NCO-reactive compound, c) at least one thermolatent inorganic tin-containing catalyst, d) optionally further catalysts and/or activators other than c), e) optionally fillers, pigments, additives, thickeners, antifoams and/or other auxiliary substances and additives, wherein the ratio of the weight of the tin from component c) and the weight of component a) is less than 3000 ppm when component a) is an aliphatic polyisocyanate and less than 95 ppm when component a) is an aromatic polyisocyanate, wherein as thermolatent catalysts cyclic tin compounds of formula I, II or III:

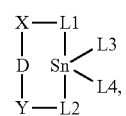

(I)

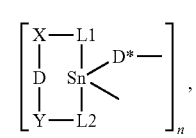

(II)

wherein n>1,

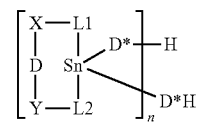
(III)

are used.

14 Claims, No Drawings

(56) References Cited

U.S. PATENT DOCUMENTS

| | | | |
|---|---|---|---|
| 4,430,456 A | 2/1984 | Bechara et al. | |
| 4,549,945 A | 10/1985 | Lindstrom | |
| 6,187,711 B1 | 2/2001 | Bernard et al. | |
| 2008/0027198 A1* | 1/2008 | Naruse et al. | 528/9 |
| 2008/0277137 A1 | 11/2008 | Timmers et al. | |
| 2011/0054140 A1* | 3/2011 | Krause et al. | 528/53 |

FOREIGN PATENT DOCUMENTS

| | | |
|---|---|---|
| DE | 69521682 T2 | 5/2002 |
| GB | 899948 A | 6/1962 |
| JP | 2002037834 A | 2/2002 |
| WO | WO-2005/058996 A1 | 6/2005 |
| WO | WO-2007075561 A1 | 7/2007 |
| WO | WO 2009132784 A1 * | 11/2009 |

OTHER PUBLICATIONS

Merotra et al., "Ethanolamine Derivatives of Sn(IV)", *Department of Chemistry, University of Rajasthan, Jaipur*, pp. 643-645 (1966).

Haas et al., "3.4 Additives and Auxiliary Materials", *Polyurethane Handbook*, pp. 98-119 (1993).

Jousseaume et al., "Air Activated Organotin Catalysts for Silicone Curing and Polyurethane Preparation", *Organometallics*, vol. 13, pp. 1034-1038 (1994).

Selina et al., "Metallocanes of Group 14 Elements 2.* Derivatives of Tin (Review)", *Chemistry of Heterocyclic Compounds*, vol. 43, No. 7, pp. 813-834 (2007).

Chernov et al., "Heterolepic Tin (II) Dialkoxides Stabilized by Intramolecular Coordination $Sn(OCH_2CH_2NMe_2)(OR)$ (R=Me, Et, *i*Pr, *t*Bu, Ph). Synthesis, Structure and Catalytic Activity in Polyurethane Synthesis", *Journal of Organometallic Chemistry*, vol. 694, pp. 3184-3189 (2009).

* cited by examiner

USE OF TIN CATALYSTS FOR THE PRODUCTION OF POLYURETHANE COATINGS

CROSS-REFERENCE TO RELATED APPLICATIONS

This application is a national stage application (under 35 U.S.C. §371) of PCT/EP2010/066104, filed Oct. 26, 2010, which claims benefit of German application 10 2009 051 445.7, filed Oct. 30, 2009, both of which are incorporated herein by reference in their entirety for all their useful purposes.

BACKGROUND

The invention relates to the use of specific catalysts for the production of polyisocyanate polyaddition products, in particular for the coatings sector.

Polyurethane coatings have been known for a long time and are used in many fields. They are generally produced from a polyisocyanate component and a hydroxyl component by mixing immediately prior to application (2K technology). For light-fast coatings, polyisocyanate components based on aliphatic polyisocyanates are generally used, which enter into a reaction with the hydroxyl component markedly more slowly as compared with products having aromatically bonded isocyanate groups. In most cases, therefore, the reaction must be catalysed. Heating is additionally carried out, where possible, in order to accelerate the reaction further. Organic tin compounds, in particular dibutyltin dilaurate (DBTL), have proved to be suitable as catalysts. They have the general disadvantage of an unfavourable ecological profile, which has already led, inter alia, to the complete removal of the substance class of the organotin compounds from marine paints, to which they were added as a biocide.

A general disadvantage of 2K technology is that the NCO—OH reaction proceeds slowly even at room temperature and markedly more quickly when catalysed, with the result that only a very narrow time window (open time) is available for the processing of the ready formulated mixture of such a 2K system, which window is further shortened by the presence of the catalyst.

There has therefore been no lack of attempts to develop catalysts which scarcely accelerate the crosslinking reaction on preparation of the 2K mixture but accelerate it significantly after application (latent catalysts).

A class of latent catalysts which is used in particular in the cast elastomers sector is organomercury compounds. The most prominent representative is phenyl mercury neodecanoate (trade names: Thorcat 535, Cocure 44). However, inter alia because of the toxicology of the mercury compounds, these catalysts do not play any role in coatings technology.

The focus in this sector has tended to be on systems which can be activated chemically, for example by (atmospheric) moisture and/or oxygen (see WO 2007/075561, Organometallics 1994 (13) 1034-1038, DE 69521682), and photochemically (see U.S. Pat. No. 4,549,945).

Disadvantages of the last-mentioned two systems of the prior art are on the one hand that it is difficult to ensure a defined, reproducible migration of (atmospheric) moisture or oxygen independently of the coating recipe (degree of crosslinking, glass transition temperature, solvent content, etc.) and of the ambient conditions and on the other hand that, in particular in the case of pigmented systems, there are limits to the use of radiation sources for activating the photolatent catalyst.

DESCRIPTION OF EMBODIMENTS

The object of the present invention was, therefore, to provide systems with which it is possible to produce coatings based on polyisocyanate polyaddition products which, on preparation of the 2K mixture (generally at room temperature), have an open time which is not reduced or is reduced only slightly as compared with the uncatalysed system but, after application to the substrate, cure in an accelerated manner as a result of a temperature increase and yield a coating which has the high level of qualities known for polyurethane systems. The system and the catalyst are additionally to be free of toxic heavy metals such as cadmium, mercury, lead as well as organotin compounds, organotin compounds being understood, according to the definition, as being species having at least one Sn—C bond.

Surprisingly, it has been possible to achieve this object by the use of specific inorganic Sn(IV) catalysts.

The invention provides polyisocyanate polyaddition products obtainable from
  a) at least one aliphatic, cycloaliphatic, araliphatic and/or aromatic polyisocyanate,
  b) at least one NCO-reactive compound,
  c) at least one thermolatent inorganic tin-containing catalyst,
  d) optionally further catalysts and/or activators other than c),
  e) optionally fillers, pigments, additives, thickeners, antifoams and/or other auxiliary substances and additives,
wherein the ratio of the weight of the tin from component c) and the weight of component a) is less than 3000 ppm when component a) is an aliphatic polyisocyanate and less than 95 ppm when component a) is an aromatic polyisocyanate, characterised in that there are used as thermolatent catalysts cyclic tin compounds of formula I, II or III:

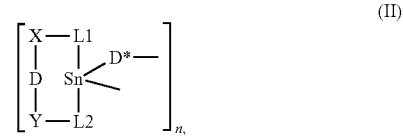

wherein n>1,

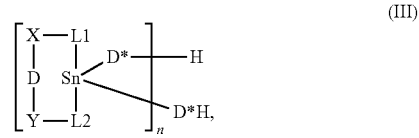

where n>1, wherein:

D represents —O—, —S— or —N(R1)-
  wherein R1 represents a saturated or unsaturated, linear or branched, aliphatic or cycloaliphatic or an optionally substituted, aromatic or araliphatic radical having up to 20 carbon atoms, which can optionally contain heteroatoms from the group oxygen, sulfur, nitrogen, or represents hydrogen or the radical

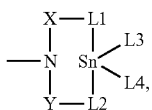

or R1 and L3 together represent —Z-L5-;

D* represents —O— or —S—;

X, Y and Z represent identical or different radicals selected from alkylene radicals of the formulae —C(R2)(R3)-, —C(R2)(R3)-C(R4)(R5)- or —C(R2)(R3)-C(R4)(R5)-C(R6)(R7)- or ortho-arylene radicals of the formulae

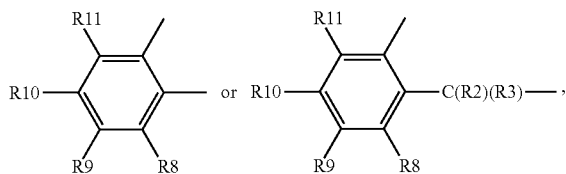

wherein R2 to R11 independently of one another represent saturated or unsaturated, linear or branched, aliphatic or cycloaliphatic or optionally substituted, aromatic or araliphatic radicals having up to 20 carbon atoms, which can optionally contain heteroatoms from the group oxygen, sulfur, nitrogen, or represent hydrogen;

L1, L2 and L5 independently of one another represent —O—, —S—, —OC(=O)—, —OC(=S)—, —SC(=O)—, —SC(=S)—, —OS(=O)$_2$O—, —OS(=O)$_2$— or —N(R12)-,
  wherein R12 represents a saturated or unsaturated, linear or branched, aliphatic or cycloaliphatic or an optionally substituted, aromatic or araliphatic radical having up to 20 carbon atoms, which can optionally contain heteroatoms from the group oxygen, sulfur, nitrogen, or represents hydrogen;

L3 and L4 independently of one another represent —OH, —SH, —OR13, -Hal, —OC(=O)R14, —SR15, —OC(=S)R16, —OS(=O)$_2$OR17, —OS(=O)$_2$R18 or —NR19R20, or L3 and L4 together represent -L1-X-D-Y-L2-,
  wherein R13 to R20 independently of one another represent saturated or unsaturated, linear or branched, aliphatic or cycloaliphatic or optionally substituted, aromatic or araliphatic radicals having up to 20 carbon atoms, which can optionally contain heteroatoms from the group oxygen, sulfur, nitrogen, or represent hydrogen.

D is preferably —N(R1)-.

R1 is preferably hydrogen or an alkyl, aralkyl, alkaryl or aryl radical having up to 20 carbon atoms or the radical

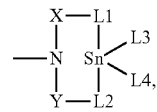

particularly preferably hydrogen or an alkyl, aralkyl, alkaryl or aryl radical having up to 12 carbon atoms or the radical

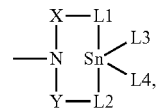

most particularly preferably hydrogen or a methyl, ethyl, propyl, butyl, hexyl or octyl radical, wherein propyl, butyl, hexyl and octyl represent all isomeric propyl, butyl, hexyl and octyl radicals, Ph-, CH$_3$Ph- or the radical

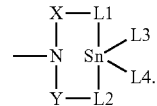

D* is preferably —O—.

X, Y and Z are preferably the alkylene radicals —C(R2)(R3)-, —C(R2)(R3)-C(R4)(R5)- or the ortho-arylene radical

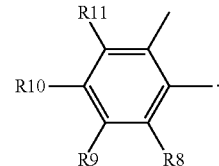

R2 to R7 are preferably hydrogen or alkyl, aralkyl, alkaryl or aryl radicals having up to 20 carbon atoms, particularly preferably hydrogen or alkyl, aralkyl, alkaryl or aryl radicals having up to 8 carbon atoms, most particularly preferably hydrogen or alkyl radicals having up to 8 carbon atoms, yet more preferably hydrogen or methyl.

R8 to R11 are preferably hydrogen or alkyl radicals having up to 8 carbon atoms, particularly preferably hydrogen or methyl.

L1, L2 and L5 are preferably —NR12-, —S—, —SC(=S)—, —SC(=O)—, —OC(=S)—, —O— or —OC(=O)—, particularly preferably —O— or —OC(=O)—.

R12 is preferably hydrogen or an alkyl, aralkyl, alkaryl or aryl radical having up to 20 carbon atoms, particularly preferably hydrogen or an alkyl, aralkyl, alkaryl or aryl radical having up to 12 carbon atoms, most particularly preferably hydrogen or a methyl, ethyl, propyl, butyl, hexyl or octyl radicals, wherein propyl, butyl, hexyl and octyl represent all isomeric propyl, butyl, hexyl and octyl radicals.

L3 and L4 are preferably -Hal, —OH, —SH, —OR13, —OC(=O)R14, wherein the radicals R13 and R14 have up to 20 carbon atoms, preferably up to 12 carbon atoms. L3 and L4 are particularly preferably Cl—, MeO—, EtO—, PrO—, BuO—, HexO—, OctO—, PhO—, formate, acetate, propanoate, butanoate, pentanoate, hexanoate, octanoate, laurate, lactate or benzoate, wherein Pr, Bu, Hex and Oct represent all isomeric propyl, butyl, hexyl and octyl radicals, yet more preferably Cl—, MeO—, EtO—, PrO—, BuO—, HexO—, OctO—, PhO—, hexanoate, laurate or benzoate, wherein Pr, Bu, Hex and Oct represent all isomeric propyl, butyl, hexyl and octyl radicals.

R15 to R20 are preferably hydrogen or alkyl, aralkyl, alkaryl or aryl radicals having up to 20 carbon atoms, particularly preferably hydrogen or alkyl, aralkyl, alkaryl or aryl radicals having up to 12 carbon atoms, most particularly preferably hydrogen, methyl, ethyl, propyl, butyl, hexyl or octyl radicals, wherein propyl, butyl, hexyl and octyl represent all isomeric propyl, butyl, hexyl and octyl radicals.

The units L1-X, L2-Y and L5-Z preferably represent —CH$_2$CH$_2$O—, —CH$_2$CH(Me)O—, —CH(Me)CH$_2$O—, —CH$_2$C(Me)$_2$O—, —C(Me)$_2$CH$_2$O— or —CH$_2$C(=O)O—.

The unit L1-X-D-Y-L2 preferably represents: HN[CH$_2$CH$_2$O—]$_2$, HN[CH$_2$CH(Me)O—]$_2$, HN[CH$_2$CH(Me)O—][CH(Me)CH$_2$O—], HN[CH$_2$C(Me)$_2$O—]$_2$, HN[CH$_2$C(Me)$_2$O—][C(Me)$_2$CH$_2$O—], HN[CH$_2$C(=O)O—]$_2$, MeN[CH$_2$CH$_2$O—]$_2$, MeN[CH$_2$CH(Me)O—]$_2$, MeN[CH$_2$CH(Me)O—][CH(Me)CH$_2$O—], MeN[CH$_2$C(Me)$_2$O—]$_2$, MeN[CH$_2$C(Me)$_2$O—][C(Me)$_2$CH$_2$O—], MeN[CH$_2$C(=O)O—]$_2$, EtN[CH$_2$CH$_2$O—]$_2$, EtN[CH$_2$CH(Me)O—]$_2$, EtN[CH$_2$CH(Me)O—][CH(Me)CH$_2$O—], EtN[CH$_2$C(Me)$_2$O—]$_2$, EtN[CH$_2$C(Me)$_2$O—][C(Me)$_2$CH$_2$O—], EtN[CH$_2$C(=O)O—]$_2$, PrN[CH$_2$CH$_2$O—]$_2$, PrN[CH$_2$CH(Me)O—]$_2$, PrN[CH$_2$CH(Me)O—][CH(Me)CH$_2$O—], PrN[CH$_2$C(Me)$_2$O—]$_2$, PrN[CH$_2$C(Me)$_2$O—][C(Me)$_2$CH$_2$O—], PrN[CH$_2$C(=O)O—]$_2$, BuN[CH$_2$CH$_2$O—]$_2$, BuN[CH$_2$CH(Me)O—]$_2$, BuN[CH$_2$CH(Me)O—][CH(Me)CH$_2$O—], BuN[CH$_2$C(Me)$_2$O—]$_2$, BuN[CH$_2$C(Me)$_2$O—][C(Me)$_2$CH$_2$O—], BuN[CH$_2$C(=O)O—]$_2$, HexN[CH$_2$CH$_2$O—]$_2$, HexN[CH$_2$CH(Me)O—]$_2$, HexN[CH$_2$CH(Me)O—][CH(Me)CH$_2$O—], HexN[CH$_2$C(Me)$_2$O—]$_2$, HexN[CH$_2$C(Me)$_2$O—][C(Me)$_2$CH$_2$O—], HexN[CH$_2$C(=O)O—]$_2$, OctN[CH$_2$CH$_2$O—]$_2$, OctN[CH$_2$CH(Me)O—]$_2$, OctN[CH$_2$CH(Me)O—][CH(Me)CH$_2$O—], OctN[CH$_2$C(Me)$_2$O—]$_2$, OctN[CH$_2$C(Me)$_2$O—][C(Me)$_2$CH$_2$O—], OctN[CH$_2$C(=O)O—]$_2$, wherein Pr, Bu, Hex and Oct can represent all isomeric propyl, butyl, hexyl and octyl radicals, PhN[CH$_2$CH$_2$O—]$_2$, PhN[CH$_2$CH(Me)O—]$_2$, PhN[CH$_2$CH(Me)O—][CH(Me)CH$_2$O—], PhN[CH$_2$C(Me)$_2$O—]$_2$, PhN[CH$_2$C(Me)$_2$O—][C(Me)$_2$CH$_2$O—], PhN[CH$_2$C(=O)O—]$_2$,

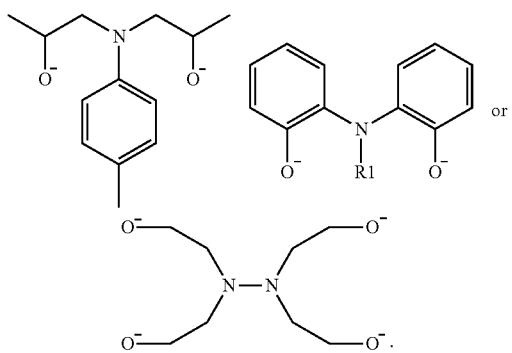

The tin compounds—as is known to the person skilled in the art—tend to oligomerisation, so that polynuclear tin compounds or mixtures of mono- and poly-nuclear tin compounds are frequently present. In the polynuclear tin compounds, the tin atoms are preferably bonded together via oxygen atoms ("oxygen bridges", vide intra). Typical oligomeric complexes (polynuclear tin compounds) form, for example, by condensation of the tin atoms via oxygen or sulfur, for example

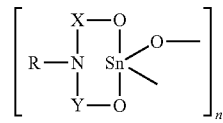

where n>1 (see formula II). There are frequently found at low degrees of oligomerisation cyclic oligomers with OH or SH end groups and at higher degrees of oligomerisation linear oligomers with OH or SH end groups (see formula III).

The invention further provides a process for the production of the polyisocyanate polyaddition products according to the invention, wherein
   a) at least one aliphatic, cycloaliphatic, araliphatic and/or aromatic polyisocyanate is reacted with
   b) at least one NCO-reactive compound in the presence of
   c) at least one thermolatent inorganic tin-containing catalyst,
   d) optionally further catalysts and/or activators other than c) and
   e) optionally fillers, pigments, additives, thickeners, antifoams and/or other auxiliary substances and additives,
   wherein the ratio of the weight of the tin from component c) and the weight of component a) is less than 3000 ppm when component a) is an aliphatic polyisocyanate and less than 95 ppm when component a) is an aromatic polyisocyanate, characterised in that there are used as thermolatent catalysts cyclic tin compounds of formula I, II or III:

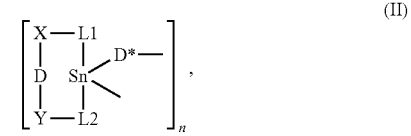

where n>1,

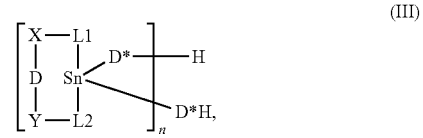

where n>1,
wherein the definitions given above apply for D, D*, Y, X and L1 to L4.

In cases in which the tin compounds contain ligands with free OH and/or NH radicals, the catalyst can be incorporated into the product in the polyisocyanate polyaddition reaction.

A particular advantage of these incorporable catalysts is their greatly reduced fogging behaviour, which is important in particular when polyurethane coatings are used in automotive interiors.

The various production methods for the tin(IV) compounds to be used according to the invention, or their tin(II) precursors, are described inter alia in: *J. Organomet. Chem.* 2009 694 3184-3189, *Chem. Heterocycl. Comp.* 2007 43 813-834, *Indian J. Chem.* 1967 5 643-645 and in literature cited therein.

A number of cyclic tin compounds have already also been proposed for use as catalysts for the isocyanate polyaddition process, see DD 242617, U.S. Pat. No. 3,164,557, DE 1111377, U.S. Pat. No. 4,430,456, GB 899948, US 2008/0277137. However, it is a common feature of all these prior-described systems of the prior art that the compounds are, without exception, Sn(II) or organotin(IV) compounds. In addition, the organotin(IV) compounds with alkyl groups at positions L3 and L4, which are extremely similar to the catalysts according to the invention, do not exhibit any thermolatency at all and shorten the open time of the formulation even as compared with the standard organotin catalyst DBTL (comparison examples 4 to 5).

The latent catalysts can be combined with further catalysts/activators known from the prior art; for example, titanium, zirconium, bismuth, tin(II) and/or iron-containing catalysts, as are described, for example, in WO 2005/058996. The addition of amines or amidines is also possible. Moreover, acidic compounds such as, for example, 2-ethylhexanoic acid or alcohols can also be added in the polyisocyanate polyaddition reaction in order to control the reaction.

The catalyst according to the invention can be added to the reaction mixture via the NCO-reactive compound (polyol), dissolved in a solvent or pre-dissolved in the polyisocyanate.

The polyisocyanates (a) suitable for the production of polyisocyanate polyaddition products, in particular polyurethanes, are the organic aliphatic, cycloaliphatic, araliphatic and/or aromatic polyisocyanates having at least two isocyanate groups per molecule known per se to the person skilled in the art, and mixtures thereof. Examples of such polyisocyanates are di- or tri-isocyanates, such as, for example, butane diisocyanate, pentane diisocyanate, hexane diisocyanate (hexamethylene diisocyanate, HDI), 4-isocyanatomethyl-1,8-octane diisocyanate (triisocyanatononane, TIN), 4,4'-methylene-bis(cyclohexylisocyanate) ($H_{12}$MDI), 3,5,5-trimethyl-1-isocyanato-3-isocyanatomethylcyclohexane (isophorone diisocyanate, IPDI), 1,3- and 1,4-bis(isocyanatomethyl)cyclohexane ($H_6$XDI), 1,5-naphthalene diisocyanate, diisocyanatodiphenyl-methane (2,2'-, 2,4'- and 4,4'-MDI or mixtures thereof), diisocyanatomethylbenzene (2,4- and 2,6-toluene diisocyanate, TDI) and commercial mixtures of the two isomers, as well as 1,3-bis(iso-cyanatomethyl)benzene (XDI), 3,3'-dimethyl-4,4'-biphenyl diisocyanate (TODI), 1,4-paraphenylene diisocyanate (PPDI) as well as cyclohexyl diisocyanate (CHDI) and the polyisocyanates obtainable from the above-mentioned higher molecular weight oligomers, obtainable individually or in mixtures, having biuret, uretdione, isocyanurate, iminooxadiazinedione, allophanate, urethane and carbodiimide/uretonimine structural units. Polyisocyanates based on aliphatic and cycloaliphatic diisocyanates are preferably used.

The polyisocyanate component (a) can be present in a suitable solvent. Suitable solvents are those which exhibit sufficient solubility of the polyisocyanate component and are free of groups reactive towards isocyanates. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, ethylal, butylal, 1,3-dioxolane, glycerolformal, benzene, toluene, n-hexane, cyclohexane, solvent naphtha, 2-methoxypropyl acetate (MPA).

The isocyanate component can additionally contain conventional auxiliary substances and additives, such as, for example, rheology improvers (for example ethylene carbonate, propylene carbonate, dibasic esters, citric acid esters), stabilisers (for example Broenstedt and Lewis acids, such as, for example, hydrochloric acid, phosphoric acid, benzoyl chloride, organo-mineral acids such as dibutyl phosphate, also adipic acid, malic acid, succinic acid, racemic acid or citric acid), UV stabilisers (for example 2,6-dibutyl-4-methylphenol), hydrolytic stabilisers (for example sterically hindered carbodiimides), emulsifiers as well as catalysts (for example trialkylamines, diazabicyclooctane, tin dioctoate, dibutyltin dilaurate, N-alkylmorpholine, lead, zinc, tin, calcium, magnesium octoate, the corresponding naphthenates and p-nitrophenolate and/or also mercury phenyl neodecanoate) and fillers (for example chalk), optionally colourings which can be incorporated into the polyurethane/polyurea subsequently to be formed (that is to say which have Zerewitinoff-active hydrogen atoms) and/or colouring pigments.

There can be used as NCO-reactive compounds (b) all compounds known to the person skilled in the art that have a mean OH or NH functionality of at least 1.5. Such compounds can be, for example, low molecular weight diols (e.g. 1,2-ethanediol, 1,3- or 1,2-propanediol, 1,4-butanediol), triols (e.g. glycerol, trimethylolpropane) and tetraols (e.g. pentaerythritol), short-chained polyamines, but also higher molecular weight polyhydroxy compounds such as polyether polyols, polyester polyols, polycarbonate polyols, polysiloxane polyols, polyamines and polyether polyamines as well as polybutadiene polyols. Polyether polyols are obtainable in a manner known per se by alkoxylation of suitable starter molecules with base catalysis or using double metal cyanide compounds (DMC compounds). Suitable starter molecules for the preparation of polyether polyols are, for example, simple, low molecular weight polyols, water, organic polyamines having at least two N—H bonds or arbitrary mixtures of such starter molecules. Preferred starter molecules for the preparation of polyether polyols by alkoxylation, in particular by the DMC process, are in particular simple polyols such as ethylene glycol, 1,3-propylene glycol and 1,4-butanediol, 1,6-hexanediol, neopentyl glycol, 2-ethyl-1,3-hexanediol, glycerol, trimethylolpropane, pentaerythritol as well as low molecular weight, hydroxyl-group-containing esters of such polyols with dicarboxylic acids of the type mentioned by way of example below or low molecular weight ethoxylation or propoxylation products of such simple polyols or arbitrary mixtures of such modified or unmodified alcohols. Alkylene oxides suitable for the alkoxylation are in particular ethylene oxide and/or propylene oxide, which can be used in the alkoxylation in any desired sequence or also in admixture. Polyester polyols can be prepared in known manner by polycondensation of low molecular weight polycarboxylic acid derivatives, such as, for example, succinic acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid, trimer fatty acid, phthalic acid, phthalic anhydride, isophthalic acid, terephthalic acid, citric acid or trimellitic acid, with low molecular weight polyols, such as, for example, ethylene glycol, diethylene glycol, neopentyl glycol, hexanediol, butanediol, propylene glycol, glycerol, trimethylolpropane, 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol, or by ring-opening polymerisation of cyclic carboxylic acid esters, such as ε-caprolactone. In addition, hydroxycarboxylic acid derivatives, such as, for example, lactic acid, cinnamic acid or ω-hydroxycaproic acid, can also be polycondensed to polyester polyols. However, polyester polyols of oleochemical origin can also be used. Such polyester polyols can be prepared, for example, by complete ring opening of epoxidised triglycerides of an at least partially olefinically unsaturated fatty-acid-containing fatty mixture with one or more alcohols having from 1 to 12 carbon atoms and by subsequent partial transesterification of the triglyceride derivatives to alkylester polyols having from 1 to 12 carbon atoms in the alkyl radical. The preparation of suitable polyacrylate polyols is known per se to the person skilled in the art. They are obtained by radical polymerisation of hydroxyl-group-containing, olefinically unsaturated monomers or by radical copolymerisation of hydroxyl-group-containing, olefinically unsaturated monomers with optionally other olefinically unsaturated monomers, such as, for example, ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable hydroxyl-group-containing, olefinically unsaturated monomers are in particular 2-hydroxyethyl acrylate, 2-hydroxyethyl methacrylate, the hydroxypropyl acrylate isomer mixture obtainable by addition of propylene oxide to acrylic acid, and the hydroxypropyl methacrylate isomer mixture obtainable by addition of propylene oxide to methacrylic acid. Suitable radical initiators are those from the group of the azo compounds, such as, for example, azoisobutyronitrile (AIBN), or from the group of the peroxides, such as, for example, di-tert-butyl peroxide.

Compounds b) are preferably higher molecular weight polyhydroxy compounds.

Component (b) can be present in a suitable solvent. Suitable solvents are those which exhibit sufficient solubility of the component. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, ethylal, butylal, 1,3-dioxolane, glycerolformal, benzene, toluene, n-hexane, cyclohexane, solvent naphtha, 2-methoxypropyl acetate (MPA). In addition, the solvents can also carry groups reactive towards isocyanates. Examples of such reactive solvents are those which have a mean functionality of groups reactive towards isocyanates of at least 1.8. They can be, for example, low molecular weight diols (e.g. 1,2-ethanediol, 1,3- or 1,2-propanediol, 1,4-butanediol), triols (e.g. glycerol, trimethylolpropane), but also low molecular weight diamines, such as, for example, polyaspartic acid esters.

The process for the production of the polyisocyanate polyaddition products can be carried out in the presence of conventional rheology improvers, stabilisers, UV stabilisers, catalysts, hydrolytic stabilisers, emulsifiers, fillers, optionally incorporable colourings (that is to say which have Zerewitinoff-active hydrogen atoms) and/or colouring pigments. The addition of zeolites is also possible.

Preferred auxiliary substances and additives are blowing agents, fillers, chalk, carbon black or zeolites, flame retardants, colouring pastes, water, antimicrobial agents, flow improvers, thixotropic agents, surface-modifying agents and retardants in the production of the polyisocyanate polyaddition products. Further auxiliary substances and additives include antifoams, emulsifiers, foam stabilisers and cell regulators. An overview is given in G. Oertel, Polyurethane Handbook, 2nd Edition, Carl Hanser Verlag, Munich, 1994, Chap. 3.4.

The systems according to the invention can be applied to the article to be coated in solution or from the melt or, in the case of powder coatings, in solid form, by methods such as brushing, roller coating, pouring, spraying, dipping, fluidised bed processes or by electrostatic spraying processes. Suitable substrates are, for example, materials such as metals, wood, plastics or ceramics.

The invention therefore further provides coating compositions containing the polyisocyanate polyaddition products according to the invention, as well as coatings obtainable therefrom and substrates coated with such coatings.

Examples

The invention is to be explained in greater detail by means of the following examples. In the examples, all percentages are to be understood as being percent by weight, unless indicated otherwise. All reactions were carried out under a dry nitrogen atmosphere. The catalysts from Table 1 were obtained by standard literature procedures (see *Chem. Heterocycl. Comp.* 2007 43 813-834 and literature cited therein), DBTL was obtained from Kever Technologie, Ratingen, D.

For the purpose of better comparability of the activity of the catalysts to be used according to the invention and the catalysts from the comparison examples, the amount of catalyst was given as mg Sn per kg polyisocyanate curing agent (ppm), the commercial product Desmodur N 3300 from Bayer MaterialScience AG, Leverkusen, D, generally being used as the polyisocyanate curing agent, and precisely one equivalent of 2-ethylhexanol (based on the free isocyanate groups of the polyisocyanate curing agent, product from Aldrich, Taufkirchen, D) being used as the model compound for the isocyanate-reactive component ("poly"ol). The addition of 10% (based on Desmodur N 3300) of n-butyl acetate ensured that samples of sufficiently low viscosity could be removed throughout the reaction, permitting accurate determination of the NCO content by means of titration according to DIN 53 185. The NCO content calculated at the start of the reaction without any NCO—OH reaction is 12.2%; tests in which the NCO content fell to 0.1% were terminated.

Comparison test 1, at a constant temperature of 30° C., shows the fall in the NCO content of the mixture in the uncatalysed case (Table 2, test 1). In order to permit a comparison of the acceleration of the reaction at a "curing temperature" of 60° C. and 80° C., tests at an initially constant temperature of 30° C. (2 hours) and then 60 and 80° C. were first likewise carried out without catalyst (Table 2, tests 2 and 3). Comparison tests 4 to 6 show the absence of thermolatency in organotin compounds which are structurally closely related to the catalysts according to the invention. It is clear from examples 7 to 15 according to the invention that the NCO—OH reaction is scarcely accelerated at 30° C. with the claimed class of cyclic tin(IV) compounds; depending on the type and concentration of the catalyst, a reactivity customised to the particular requirement can be achieved by increasing the temperature to 60° C. or 80° C. For example, catalyst 4 (2,2-diisopropoxy-6-methyl-1,3,6,2-dioxazastannocane, examples 8 and 9) at a constant concentration is still almost inactive at 60° C., whereas the reaction at 80° C. is accelerated significantly as compared with the uncatalysed comparison test 3.

TABLE 1

Overview of the catalysts to be used
(DBTL and Cat. 1 and 2 comparison, Cat. 3 to 10 according to the invention)

| Catalyst | Structural formula | Empirical formula | Molar weight [g/mol] | Sn content |
|---|---|---|---|---|
| DBTL (comparison) | $C_{11}H_{23}$–C(O)–O–Sn(Bu)(Bu)–O–C(O)–$C_{11}H_{23}$ | C32H64O4Sn | 631.55 | 18.79% |
| Cat. 1 (comparison) | Bu₂Sn bonded in 6-membered ring with two OC(O)CH₂ groups and N–H | C12H23NO4Sn | 364.01 | 32.61% |
| Cat. 2 (comparison) | Bu₂Sn bonded in 6-membered ring with two OC(O)CH₂ groups and N–CH₃ | C13H25NO4Sn | 378.04 | 31.40% |
| Cat. 3 (invention) | Cl₂Sn bonded in dioxazastannocane ring with N–CH₃ | C5H11Cl2NO2Sn | 306.74 | 38.69% |
| Cat. 4 (invention) | (iPrO)₂Sn bonded in dioxazastannocane ring with N–CH₃ | C11H25NO4Sn | 354.02 | 33.53% |
| Cat. 5 (invention) | Sn with two PhC(O)O– groups and dioxazastannocane ring (gem-dimethyl substituted) with N–nOct | C30H43NO6Sn | 632.37 | 18.77% |
| Cat. 6 (invention) | Sn[dioxazastannocane ring (gem-dimethyl substituted), N–nOct]₂ | C32H66N2O4Sn | 661.58 | 17.94% |

TABLE 1-continued

Overview of the catalysts to be used
(DBTL and Cat. 1 and 2 comparison, Cat. 3 to 10 according to the invention)

| Catalyst | Structural formula | Empirical formula | Molar weight [g/mol] | Sn content |
|---|---|---|---|---|
| Cat. 7 (invention) | (structure) | C26H31NO8Sn | 604.23 | 19.64% |
| Cat. 8 (invention) | (structure) | C26H35NO6Sn | 576.26 | 20.60% |
| Cat. 9 (invention) | (structure) | C41H69NO8S2Sn | 886.83 | 13.38% |

R1 = $C_{12}H_{25}$—(phenyl)—

TABLE 2

Overview of the tests carried out (Examples 1-6: comparison examples, Examples 7 to 15: according to the invention)

| Ex. No. | Cat. | Cat. conc.[1] | NCO content of the mixture after [hh:mm] | | | | | | | | | |
|---|---|---|---|---|---|---|---|---|---|---|---|---|
| | | | 00:30 | 1:00 | 1:30 | 2:00 | 2:10 | 2:20 | 2:30 | 3:00 | 3:30 | 4:00 |
| 1 | none | 0[2] | 11.9 | 11.6 | 11.5 | 11.3 | 11.2 | 11.0 | 10.9 | 10.8 | 10.6 | 10.4 |
| 2 | none | 0[3] | 11.9 | 11.7 | 11.6 | 11.4 | 11.2 | 10.8 | 10.5 | 9.0 | 7.6 | 6.6 |
| 3 | none | 0[4] | 11.9 | 11.8 | 11.7 | 11.7 | 11.6 | 10.7 | 8.8 | 5.3 | 4.0 | 2.7 |
| 4 | DBTL | 21[3] | 7.9 | 6.4 | 5.9 | 5.3 | 5.0 | 4.2 | 2.7 | 1.8 | 1.3 | 1.1 |
| 5 | Cat. 1 | 23[3] | 6.8 | 4.8 | 3.5 | 2.5 | 1.8 | 1.1 | 0.3 | 0.1 | | |
| 6 | Cat. 2 | 22[3] | 8.9 | 7.1 | 5.7 | 4.7 | 4.1 | 1.8 | 0.9 | 0.3 | 0.2 | 0.1 |
| 7 | Cat. 3 | 11[3] | 11.7 | 11.5 | 11.2 | 10.6 | 9.8 | 8.5 | 7.1 | 4.5 | 2.7 | 2.0 |
| 8 | Cat. 4 | 23[3] | 11.9 | 11.6 | 11.4 | 11.3 | 9.8 | 9.4 | 9.2 | 7.8 | 6.1 | 4.3 |
| 9 | Cat. 4 | 23[4] | 11.7 | 11.6 | 11.5 | 11.4 | 11.0 | 9.9 | 7.0 | 2.4 | 1.4 | 1.0 |
| 10 | Cat. 5 | 60[3] | 11.7 | 11.2 | 10.8 | 10.4 | 10.3 | 9.9 | 8.9 | 5.9 | 4.2 | 2.9 |
| 11 | Cat. 6 | 20[3] | 12.0 | 11.6 | 11.5 | 11.1 | 10.7 | 9.6 | 9.1 | 7.4 | 5.9 | 4.1 |
| 12 | Cat. 7 | 20[3] | 11.6 | 11.2 | 10.9 | 10.7 | 10.6 | 9.6 | 8.9 | 6.6 | 4.8 | 4.1 |
| 13 | Cat. 8 | 20[3] | 11.8 | 11.7 | 11.5 | 11.2 | 11.2 | 10.9 | 104 | 7.6 | 6.7 | 5.8 |
| 14 | Cat. 8 | 60[3] | 11.5 | 11.6 | 11.5 | 11.1 | 10.7 | 10.3 | 9.6 | 6.8 | 5.8 | 4.6 |
| 15 | Cat. 9 | 21[4] | 11.7 | 11.6 | 11.5 | 11.4 | 11.0 | 10.3 | 9.8 | 4.2 | 2.2 | 1.4 |

[1]Sn [ppm] based on polyisocyanate curing agent
[2]constant 30° C.
[3]first 2 h 30° C., then 60° C.
[4]first 2 h 30° C., then 80° C.

The invention claimed is:

1. A polyisocyanate polyaddition product obtained from
a) at least one aliphatic, cycloaliphatic, araliphatic and/or aromatic polyisocyanate,
b) at least one NCO-reactive compound,
c) at least one thermolatent inorganic tin-containing catalyst,
d) optionally further catalysts and/or activators other than c),
e) optionally fillers, pigments, additives, thickeners, antifoams and/or other auxiliary substances and additives,
wherein the ratio of the weight of the tin from component c) and the weight of component a) is less than 3000 ppm when component a) is an aliphatic polyisocyanate and less than 95 ppm when component a) is an aromatic polyisocyanate, wherein the thermolatent inorganic tin-containing catalyst comprises compounds of formula I, II or III:

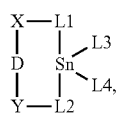     (I)

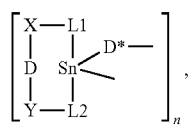     (II)

where n>1,

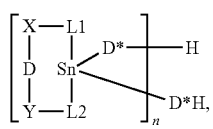     (III)

where n>1,
wherein:
D represents —O—, —S— or —N(R1)-
  wherein R1 represents a saturated or unsaturated, linear or branched, aliphatic or cycloaliphatic or an aromatic or aralphatic radical having up to 20 carbon atoms, which can optionally contain heteroatoms from the group oxygen, sulfur, nitrogen, or represents hydrogen or the radical

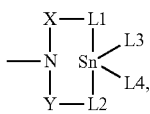

or R1 and L3 together represent —Z-L5-;
D* represents —O— or —S—;
X, Y and Z represent identical or different radicals selected from alkylene radicals of the formulae —C(R2)(R3)-, —C(R2)(R3)-C(R4)(R5)- or —C(R2)(R3)-C(R4)(R5)-C(R6)(R7)- or ortho-arylene radicals of the formulae

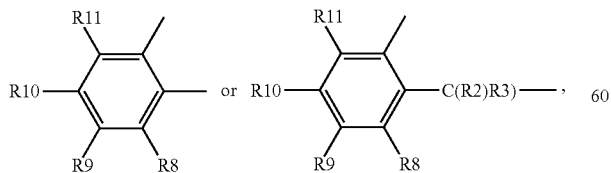

wherein R2 to R11 independently of one another represent saturated or unsaturated, linear or branched, aliphatic or cycloaliphatic or aromatic or aralphatic radicals having up to 20 carbon atoms, which can optionally contain heteroatoms from the group oxygen, sulfur, nitrogen, or represent hydrogen;

L1, L2 and L5 independently of one another represent —O—, —S—, —OC(=O)—, —OC(=S)—, —SC(=O)—, —SC(=S)—, —OS(=O)₂O—, —OS(=O)₂— or —N(R12)-,
  wherein R12 represents a saturated or unsaturated, linear or branched, aliphatic or cycloaliphatic or an aromatic or aralphatic radical having up to 20 carbon atoms, which can optionally contain heteroatoms from the group oxygen, sulfur, nitrogen, or represents hydrogen;

L3 and L4 independently of one another represent —OH, —SH, —OR13, -Hal, —OC(=O)R14, —SR15, —OC(=S)R16, —OS(=O)₂OR17, —OS(=O)₂R18 or —NR19R20, or L3 and L4 together represent -L1-X-D-Y-L2-,
  wherein R13 to R20 independently of one another represent saturated or unsaturated, linear or branched, aliphatic or cycloaliphatic or aromatic or aralphatic radicals having up to 20 carbon atoms, which can optionally contain heteroatoms from the group oxygen, sulfur, nitrogen, or represent hydrogen.

2. The polyisocyanate polyaddition product according to claim 1, wherein D is —N(R1)- and R1 is hydrogen or an alkyl, aralkyl, alkaryl or aryl radical having up to 20 carbon atoms or is the radical

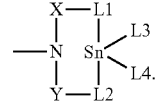

3. The polyisocyanate polyaddition product according to claim 2, wherein R1 is hydrogen or a methyl, ethyl, propyl, butyl, hexyl, octyl, Ph or CH₃Ph radical or is the radical

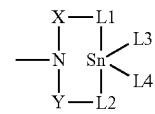

and wherein propyl, butyl, hexyl and octyl represent all isomeric propyl, butyl, hexyl and octyl radicals.

4. The polyisocyanate polyaddition product according to claim 1, wherein D* is —O—.

5. The polyisocyanate polyaddition product according to claim 1, wherein X, Y and Z independently of one another are alkylene radicals of the formula —C(R2)(R3)- or —C(R2)(R3)-C(R4)(R5)- or ortho-arylene radicals of the formula

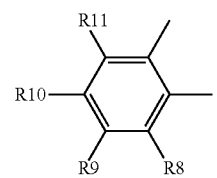

and R2 to R5 independently of one another are hydrogen, alkyl, aralkyl, alkaryl or aryl radicals having up to 20 carbon atoms and R8 to R11 independently of one another are hydrogen or alkyl radicals having up to 8 carbon atoms.

6. The polyisocyanate polyaddition product according to claim 5, wherein the radicals R2 to R5 independently of one another are hydrogen or alkyl radicals having up to 8 carbon atoms and R8 to R11 independently of one another are hydrogen or methyl.

7. The polyisocyanate polyaddition product according to claim 1, wherein L1, L2 and L5 independently of one another are —N(R12)-, —S—, —SC(=S)—, —SC(=O)—, —OC(=S)—, —O— or —OC(=O)— and R12 is hydrogen or an alkyl, aralkyl, alkaryl or aryl radical having up to 20 carbon atoms.

8. The polyisocyanate polyaddition product according to claim 7, wherein L1, L2 and L5 independently of one another are —N(H)—, —N(CH3)-, —N(C2H5)-, —N(C4H9)-, —N(C8H17)-, —N(C6H5)-, —S—, —SC(=S)—, —SC(=O)—, —OC(=S)—, —O— or —OC(=O)—.

9. The polyisocyanate polyaddition product according to claim 1, wherein L3 and L4 independently of one another are —OH, —SH, —OR13, -Hal or —OC(=O)R14 and the radicals R13 and R14 contain up to 20 carbon atoms.

10. The polyisocyanate polyaddition product according to claim 9, wherein L3 and L4 independently of one another are Cl—, MeO—, EtO—, PrO—, BuO—, HexO—, OctO—, PhO—, formate, acetate, propanoate, butanoate, pentanoate, hexanoate, octanoate, laurate, lactate or benzoate, wherein Pr, Bu, Hex and Oct represent all isomeric propyl, butyl, hexyl and octyl radicals.

11. A process for the production of the polyisocyanate polyaddition products according to claim 1, wherein the process comprises
a) reacting at least one aliphatic, cycloaliphatic, araliphatic and/or aromatic polyisocyanate with
b) at least one NCO-reactive compound in the presence of
c) at least one thermolatent inorganic tin-containing catalyst,
d) optionally further catalysts and/or activators other than c) and
e) optionally fillers, pigments, additives, thickeners, antifoams and/or other auxiliary substances and additives,
wherein the ratio of the weight of the tin from component c) and the weight of component a) is less than 3000 ppm when component a) is an aliphatic polyisocyanate and less than 95 ppm when component a) is an aromatic polyisocyanate,
wherein the thermolatent inorganic tin-containing catalyst comprises compounds of formula I, II or III:

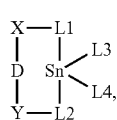
(I)

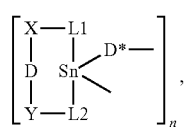
(II)

where n>1,

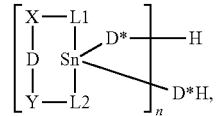
(III)

where n>1,
wherein:
D represents —O—, —S— or —N(R1)-
  wherein R1 represents a saturated or unsaturated, linear or branched, aliphatic or cycloaliphatic or an aromatic or araliphatic radical having up to 20 carbon atoms, which can optionally contain heteroatoms from the group oxygen, sulfur, nitrogen, or represents hydrogen or the radical

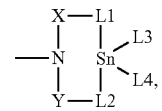

or R1 and L3 together represent —Z-L5-;
D* represents —O— or —S—;
X, Y and Z represent identical or different radicals selected from alkylene radicals of the formulae —C(R2)(R3)-, —C(R2)(R3)-C(R4)(R5)- or —C(R2)(R3)-C(R4)(R5)-C(R6)(R7)- or ortho-arylene radicals of the formulae

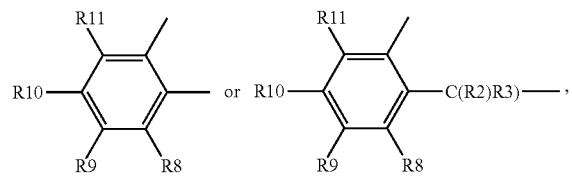

wherein R2 to R11 independently of one another represent saturated or unsaturated, linear or branched, aliphatic or cycloaliphatic or aromatic or araliphatic radicals having up to 20 carbon atoms, which can optionally contain heteroatoms from the group oxygen, sulfur, nitrogen, or represent hydrogen;
L1, L2 and L5 independently of one another represent —O—, —S—, —OC(=O)—, —OC(=S)—, —SC(=O)—, —SC(=S)—, —OS(=O)2O—, —OS(=O)2— or —N(R12)-,
  wherein R12 represents a saturated or unsaturated, linear or branched, aliphatic or cycloaliphatic or an aromatic or araliphatic radical having up to 20 carbon atoms, which can optionally contain heteroatoms from the group oxygen, sulfur, nitrogen, or represents hydrogen;
L3 and L4 independently of one another represent —OH, —SH, —OR13, -Hal, —OC(=O)R14, —SR15, —OC(=S)R16, —OS(=O)2OR17, —OS(=O)2R18 or —NR19R20, or L3 and L4 together represent -L1-X-D-Y-L2-,
  wherein R13 to R20 independently of one another represent saturated or unsaturated, linear or branched, aliphatic or cycloaliphatic or aromatic or araliphatic radicals having up to 20 carbon atoms, which can optionally contain heteroatoms from the group oxygen, sulfur, nitrogen, or represent hydrogen.

12. A coating composition comprising the polyisocyanate polyaddition product according to claim 1.

13. A coating obtained from the coating composition according to claim 12.

14. A substrate coated with coating according to claim 13.

* * * * *